United States Patent
Jeong et al.

(10) Patent No.: US 10,230,546 B2
(45) Date of Patent: Mar. 12, 2019

(54) NETWORK APPARATUS FOR INTERCONNECTING HETEROGENEOUS NETWORKS AND INTERCONNECTING METHOD THEREOF

(71) Applicant: ELECTRONICS AND TELECOMMUNICATIONS RESEARCH INSTITUTE, Daejeon (KR)

(72) Inventors: Jin Doo Jeong, Sejong-si (KR); Wan Ki Park, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 33 days.

(21) Appl. No.: 15/396,947

(22) Filed: Jan. 3, 2017

(65) Prior Publication Data
US 2017/0195137 A1   Jul. 6, 2017

(30) Foreign Application Priority Data

Jan. 4, 2016 (KR) .......................... 10-2016-0000533

(51) Int. Cl.
*H04L 12/66* (2006.01)
*H04W 76/14* (2018.01)
(Continued)

(52) U.S. Cl.
CPC ................ *H04L 12/66* (2013.01); *H04L 5/16* (2013.01); *H04L 67/04* (2013.01); *H04L 67/12* (2013.01);
(Continued)

(58) Field of Classification Search
CPC .......... H04L 12/66; H04W 76/14; H04W 4/80
See application file for complete search history.

(56) References Cited

U.S. PATENT DOCUMENTS

| 2012/0053732 A1 | 3/2012 | Park |
| 2012/0105200 A1 | 5/2012 | Yoo et al. |
| 2016/0374139 A1* | 12/2016 | Chen ..................... H04L 47/29 |

FOREIGN PATENT DOCUMENTS

| KR | 10-0824050 B1 | 4/2008 |
| KR | 10-1435626 B1 | 8/2014 |

(Continued)

OTHER PUBLICATIONS

Shengrong Yin et al., "Interconnecting WiFi Devices with IEEE 802.15.4 Devices without Using a Gateway", 2015 International Conference on Distributed Computing in Sensor Systems.*

*Primary Examiner* — Siming Liu
(74) *Attorney, Agent, or Firm* — LRK Patent Law Firm (57) ABSTRACT

A network apparatus for interconnecting heterogeneous networks and an interconnecting method thereof. The network apparatus includes a communicator configured to communicate with a heterogeneous network apparatus using the same frequency band, to communicate with the heterogeneous network apparatus through a gateway in a first communication mode, and to perform direct two-way communication with the heterogeneous network apparatus in a second communication mode; and a processor configured to determine a signal received through the communicator, and to determine a communication mode with the heterogeneous communication network.

13 Claims, 7 Drawing Sheets

(51) Int. Cl.
   *H04W 4/80*    (2018.01)
   *H04L 5/16*    (2006.01)
   *H04L 29/08*   (2006.01)
   *H04L 1/00*    (2006.01)
   *H04W 84/12*   (2009.01)
   *H04W 88/16*   (2009.01)
   *H04W 88/06*   (2009.01)
   *H04W 76/16*   (2018.01)

(52) U.S. Cl.
   CPC .............. *H04L 67/28* (2013.01); *H04W 4/80* (2018.02); *H04W 76/14* (2018.02); *H04L 1/0061* (2013.01); *H04W 76/16* (2018.02); *H04W 84/12* (2013.01); *H04W 88/06* (2013.01); *H04W 88/16* (2013.01)

(56) References Cited

FOREIGN PATENT DOCUMENTS

| | | | |
|---|---|---|---|
| KR | 10-1521970 | B1 | 5/2015 |
| KR | 10-1540797 | B1 | 7/2015 |

\* cited by examiner

NETWORK APPARATUS FOR INTERCONNECTING HETEROGENEOUS NETWORKS AND INTERCONNECTING METHOD THEREOF

CROSS-REFERENCE TO RELATED APPLICATION(S)

This application claims the priority benefit of Korean Patent Application No. 10-2016-0000533, filed Jan. 4, 2016, in the Korean Intellectual Property Office, the disclosure of which is incorporated herein by reference for all purposes.

BACKGROUND

1. Field

One or more example embodiments relate to technology for interconnecting heterogeneous networks.

2. Description of Related Art

A wireless sensor network (WSN) may be employed for energy management in the field of, for example, a smart grid, a micro grid, an advanced metering infrastructure (AMI), and the like. Institute of Electrical and Electronics Engineers (IEEE) 802.15.4 network technology, for example, ZigBee, a smart utility network (SUN), etc., may be used as the WSN to collect and control energy information, for example, electricity, water supply, gas, etc.

A high rate data transmission rate is not required in an application, such as metering of energy information. However, low power communication may be employed to achieve the simplicity of network management and energy saving. Thus, the WSN may be appropriate to transmit data at a low rate. On the contrary, an IEEE 802.11 standard-based Wi-Fi network technology, which is generally used for a mobile terminal such as a smartphone or a computer, may support a high rate data transmission rate and thus, may be appropriate to transmit large data.

A mobile terminal, such as a smartphone, or a computer may not be equipped with an IEEE 802.15.4 standard network chip or technology. Thus, an apparatus and technology exclusive for an IEEE 802.15.4 network is required to monitor, manage, and control information about an apparatus connected to a WSN based on IEEE 802.15.4 standard. However, a terminal exclusive for IEEE 802.15.4 may have some constraints in creating and managing a network operation program. Accordingly, there is a need for a gateway to connect a Wi-Fi network and a WSN so that the network operation program may wirelessly monitor, manage, and control the WSN through the mobile terminal or the computer.

SUMMARY

One or more example embodiments provide a network apparatus for interconnecting heterogeneous networks and an interconnecting method thereof.

According to an aspect, there is provided a network apparatus including a communicator configured to communicate with a heterogeneous network apparatus using the same frequency band, to communicate with the heterogeneous network apparatus through a gateway in a first communication mode, and to perform direct two-way communication with the heterogeneous network apparatus in a second communication mode; and a processor configured to determine a signal received through the communicator, and to determine a communication mode with the heterogeneous communication network.

The communicator may be further configured to perform high rate communication in the first communication mode and to perform low rate communication in the second communication mode. The communicator may be further configured to perform two-way communication with the heterogeneous network apparatus using a half duplex scheme in the second communication mode. The communicator may be further configured to perform two-way communication with the heterogeneous network apparatus using a packet pattern scheme that carries data in a packet pattern and thereby transmits the packet pattern in the second communication mode. Here, the communicator may be further configure to map and carry low rate data to the packet pattern and thereby transmit the packet pattern while transmitting middle and high rate data using an original signal.

The processor may be further configured to determine a communication mode with the heterogeneous network apparatus as the second communication mode in response to the signal received through the communicator being determined to be a packet pattern ON/OFF modulation signal. The packet pattern ON/OFF modulation signal may include a barker code for detecting the packet pattern ON/OFF modulation signal and an error detection code for determining an error.

The network apparatus may be an Institute of Electrical and Electronics Engineers (IEEE) 802.15.4 device and the heterogeneous network apparatus may be a wireless fidelity (Wi-Fi) device.

According to another aspect, there is provided a heterogeneous network interconnecting method between an IEEE 802.15.4 device and a Wi-Fi device, the method including determining, at the IEEE 802.15.4 device, whether a received signal is an IEEE 802.15.4 signal, and communicating with the Wi-Fi device through a gateway in response to the received signal being determined to be the IEEE 802.15.4 signal; and determining, at the IEEE 802.15.4 device, whether the received signal is a packet pattern ON/OFF modulation signal, and performing direct two-way communication with the Wi-Fi device without using the gateway in response to the received signal being determined to be the packet pattern ON/OFF modulation signal.

The heterogeneous network interconnecting method may further include determining whether the received signal is the IEEE 802.15.4 signal in response to failing in detecting the packet pattern ON/OFF modulation signal within a preset time.

The performing of the direct two-way communication may include detecting data through demodulation in response to the received signal being determined to be the packet pattern ON/OFF modulation signal, and verifying whether the detected data is an access request message; modulating an access response message to the packet pattern ON/OFF modulation signal in response to the detected data being verified to the access request message, and transmitting the modulated access response message to the Wi-Fi device; receiving a metering request or a control information message from the Wi-Fi device that receives the access response message, and transmitting a metering value or a control result message to the Wi-Fi device; and receiving an access cancellation message from the Wi-Fi device that receives the metering value or control result message, and cancelling the access.

The transmitting of the access response message may include transmitting the access response message to the Wi-Fi device while the Wi-Fi device is on standby during a preset period of time after transmitting the access request message.

The transmitting of the metering value or control result message may include transmitting the access value or control result message to the Wi-Fi device while the Wi-Fi device is on standby during a preset period of time after transmitting the metering request or control information message.

The packet pattern ON/OFF modulation signal may include a barker code for detecting the packet pattern ON/OFF modulation signal and an error detection code for determining an error.

According to example embodiments, communication through a gateway and direct communication without using the gateway are enabled between heterogeneous networks using the same frequency band. For example, in an application of an initial setting, a thorough testing, a failure diagnosis, etc., gateway-based middle/high rate communication may be performed. Also, in an application of a simple control, monitoring, etc., gateway-free low rate communication may be performed.

Also, according to example embodiments, in an application that requires a relatively low communication error rate, such as an initial setting, a thorough testing, a failure diagnosis, etc., communication between heterogeneous networks may be performed based on a gateway. In a low capacity and low rate data application, such as monitoring of a metering value, a simple control, etc., direct communication between heterogeneous networks may be performed. Accordingly, it is possible to eliminate inconvenience that occurs in response to a network connection through the gateway. In particular, a user may monitor a metering value or control a sensor conveniently in person using a mobile terminal, such as a smartphone or a computer, instead of using the gateway.

Also, according to example embodiments, using a half duplex scheme for two-way communication between heterogeneous networks, it is possible to prevent interference issues that occur between the heterogeneous networks due to direct communication.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", "directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The example embodiments will be described with reference to the accompanying drawings. However, the present disclosure is not limited thereto or restricted thereby. Like reference numerals in the drawings refer to like elements throughout.

Figure 1:
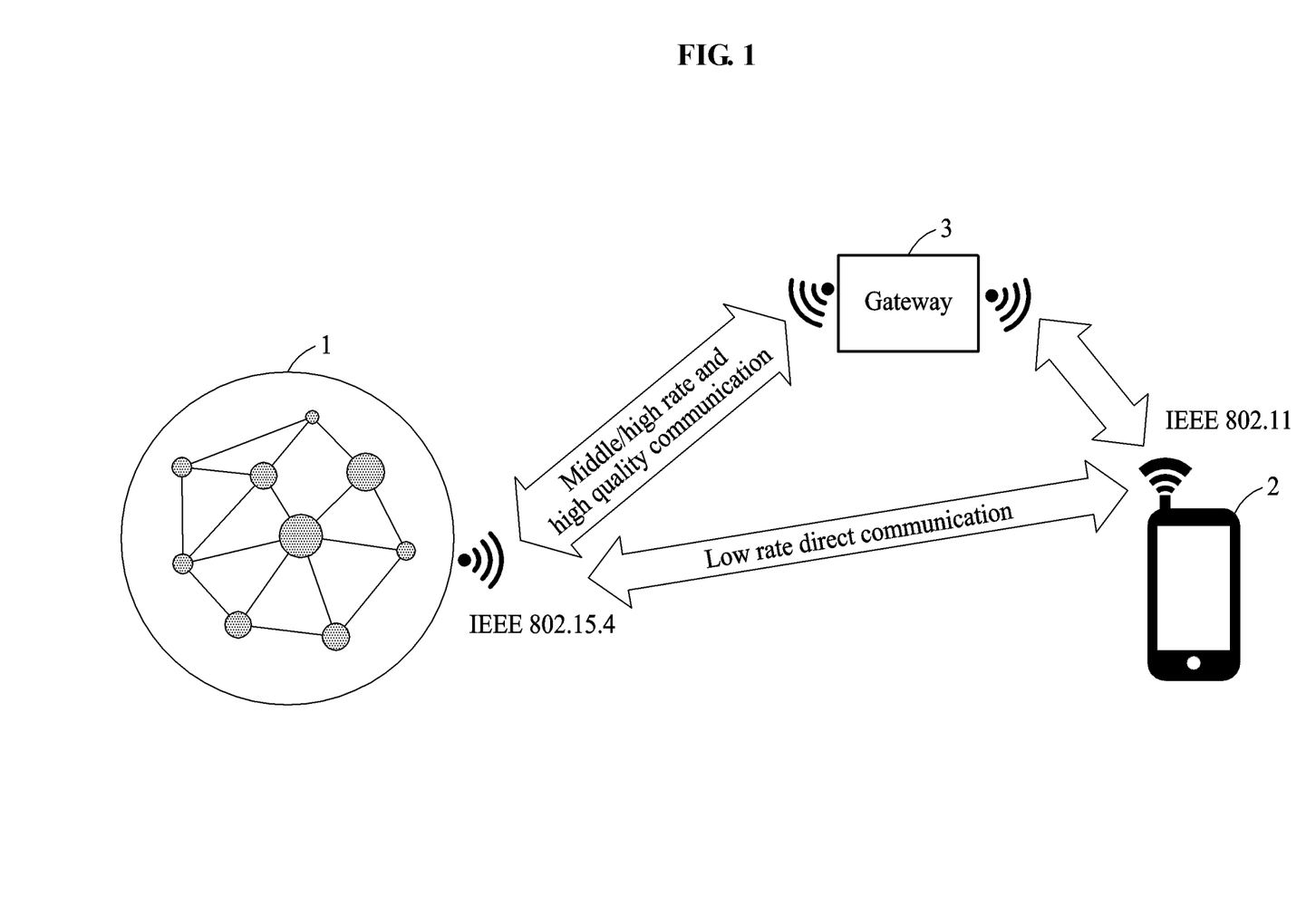
FIG. 1 illustrates an example of interconnecting heterogeneous networks based on a dual mode according to an example embodiment.

FIG. 1 illustrates an example of interconnecting heterogeneous networks based on a dual mode according to an example embodiment.

Referring to FIG. 1, interconnection between heterogeneous networks using the same frequency band is enabled. Here, both communication between heterogeneous networks through a gateway 3 and direct communication between the heterogeneous networks without using the gateway 3 may be allowed. The same frequency band may be, for example, 2.4 GHZ industry-science-medical (ISM) unlicensed band. The heterogeneous networks use different communication system. For example, the heterogeneous networks may be an Institute of Electricals and Electronics Engineers (IEEE) 802.15.4 network 1 and an IEEE 802.11 network.

As for an example of interconnection between heterogeneous networks using the same frequency band, the heterogeneous networks may be interconnected through the gateway 3 for middle/high rate and high quality communication and may perform direct communication without using the gateway 3 for low rate communication. To this end, provided is a communication scheme of a dual mode; a gateway-based middle/high rate communication mode for performing middle/high rate and high quality communication between heterogeneous network apparatuses using the gateway 3 and a low rate communication mode for direct communication between the heterogeneous network apparatuses without using the gateway 3. Low rate communication may be employed for an application, such as mirroring of energy information, simple control, and the like, and middle/high rate communication may be employed for an application, such as an initial setting, a thorough testing, a failure diagnosis, etc., of a network.

The IEEE 802.15.4 network 1 refers to a low rate wireless private area network (WPAN), and may be, for example, a wireless sensor network (WSN) such as ZigBee, a smart utility network (SNU), etc., or a wireless metering network. The IEEE 802.11 network refers to a wireless local area network (WLAN), and may be, for example, wireless fidelity (Wi-Fi).

Hereinafter, description is made based on interconnection between heterogeneous networks that include a wireless sensor/metering network and a Wi-Fi network. However, it is provided as an example only and any type of different heterogeneous networks may be applicable. A device that operates in the IEEE 802.15.4 network 1 is referred to as an IEEE 802.15.4 device, and a device that operates in the IEEE 802.11 network is referred to as a Wi-Fi device 2. The IEEE 802.15.4 device and the Wi-Fi device 2 use the same frequency, for example, 2.4 GHz ISM unlicensed band. The IEEE 802.15.4 device may be an energy information collection apparatus having a metering function, such as an automatic meter reading (AMR), advanced metering infrastructure (AMI), and the like. The Wi-Fi device 2 may be a user terminal, for example, a mobile terminal such as a smartphone, or a computer.

Through the aforementioned configuration, communication between heterogeneous networks is enabled based on a gateway in an application that requires a relatively low communication error rate, such as an initial setting, a thorough testing, a failure diagnosis, and the like. In a low capacity and low rate data application, such as monitoring of a metering value and a simple control, direct communication between the heterogeneous networks without using the gateway is enabled. Accordingly, it is possible to eliminate inconvenience that occurs in response to a network connection through the gateway. In particular, a user may monitor a metering value or control a sensor conveniently in person using a mobile terminal, such as a smartphone, or a computer, instead of using the gateway.

Figure 2:
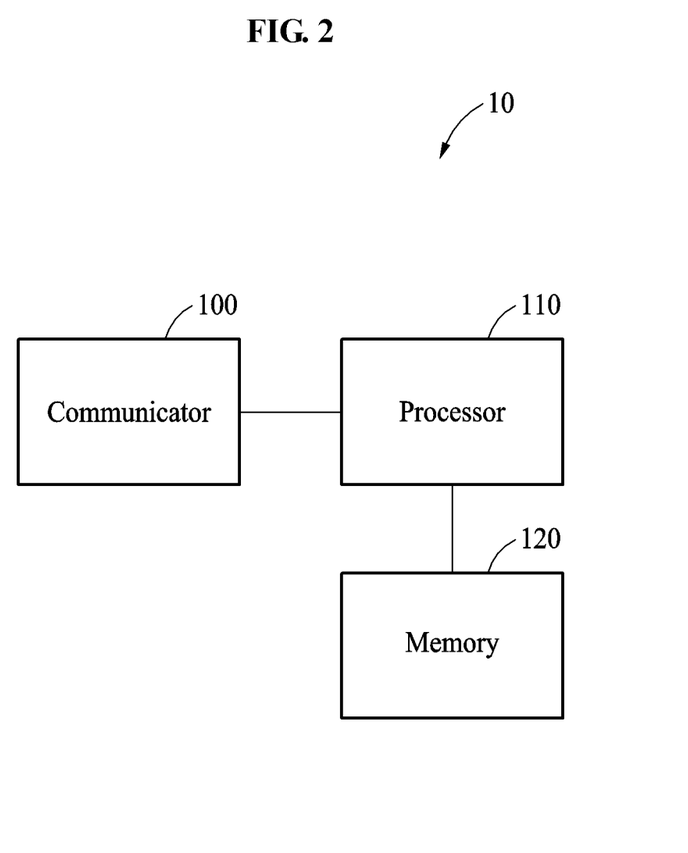
FIG. 2 is a diagram illustrating a configuration of a network apparatus according to an example embodiment.

FIG. 2 is a diagram illustrating a configuration of a network apparatus according to an example embodiment.

Referring to FIG. 2, the network apparatus 10 may include a communicator 100, a processor 110, and a memory 120. The network apparatus 10 may be the IEEE 802.15.4 device or the Wi-Fi device 2 of FIG. 1.

The communicator 100 may transmit and receive data to and from a heterogeneous network apparatus using the same frequency band. The communicator 100 may communicate with the heterogeneous network apparatus through a gateway in a first communication mode, and may perform direct two-way communication with the heterogeneous network apparatus in a second communication mode. The communicator 100 may perform high rate communication in the first communication mode and may perform low rate communication in the second communication mode. A network interconnection method in the first communication mode will be described with reference to FIG. 5A and a network interconnection method in the second communication mode will be described with reference to FIG. 5B.

The communicator 100 may communicate with the heterogeneous network apparatus using a packet pattern communication scheme that carries data in a packet pattern and thereby transmits the packet pattern in the second communication mode. Here, a packet pattern ON/OFF modulation (PPOOM) signal is used. The PPOOM signal denotes a signal that is carried in a transmission ON/OFF pattern of a transmission packet and thereby transmitted. The PPOOM signal will be described with reference to FIGS. 3A and 3B.

The communicator 100 may perform two-way communication with the heterogeneous network apparatus using a half duplex scheme in the second communication mode. The half duplex scheme will be described with reference to FIG. 4.

The processor 110 may determine a signal received through the communicator 100 and may determine a communication mode with the heterogeneous communication network.

For example, when the signal received through the communicator 100 is determined to be a PPOOM signal, the processor 100 may determine the communication mode with the heterogeneous network apparatus as the second communication mode. The PPOOM signal may include a barker code for detecting the PPOOM signal and an error detection code for determining an error. A structure of the PPOOM signal will be described with reference to FIG. 6.

The processor 110 may be connected to the communicator 100 and may process data. The processor 110 may be configured as a general processor or may be a portion of at least one application specific integrated circuit (ASIC) or digital signal processor (DSP). Although FIG. 1 illustrates a single processor 110, the number of processors 110 is not limited thereto and may be plural. The processor 110 may control an operation for communication with the heterogeneous network apparatus.

The processor 110 may determine a signal received through the communicator 110 and may determine the communication mode with the heterogeneous network apparatus. For example, if the network apparatus 10 is an IEEE 802.15.4 device, the processor 110 may determine the signal received through the communicator 100 and may operate the communicator 100 in the first communication mode based on a gateway for high rate communication in response to the received signal being determined to be an IEEE 802.15.4 signal and may operate the communicator 100 in the second communication mode for low rate and direct communication in response to the received signal being determined to be a PPOOM signal.

The memory 120 may be connected to the processor 110 and may store various types of data. The memory 120 may store an instruction that is executed through the processor 110. The memory 120 may store various types of data acquired through the communicator 100 or to be transmitted through the communicator 100. Referring to FIG. 2, the memory 120 may be included in the network apparatus 10, or may be configured in a database form separate from the network apparatus 10.

Figure 3A:
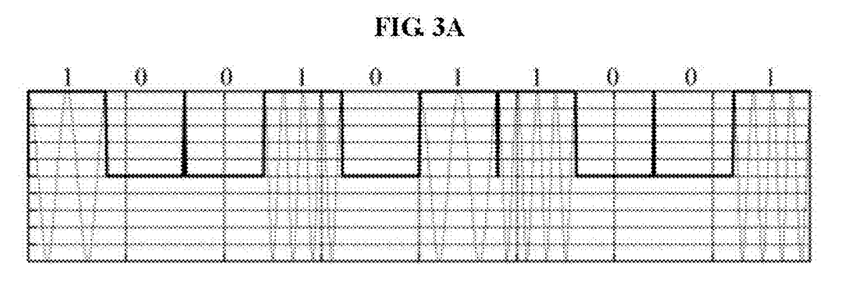
FIGS. 3A and 3B are graphs showing a signal transmission based on a packet pattern ON/OFF modulation (PPOOM) scheme according to an example embodiment.
Figure 3B:
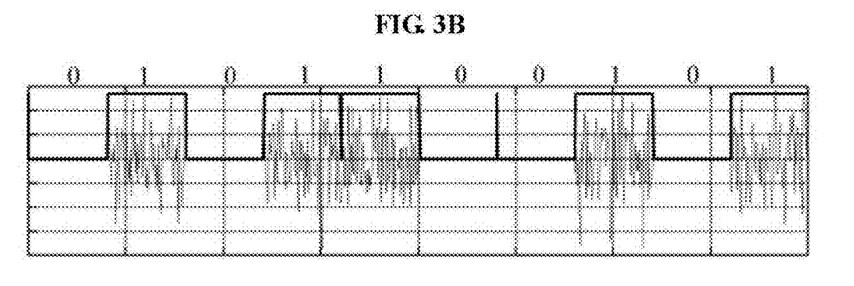

FIGS. 3A and 3B are graphs showing a signal transmission based on a PPOOM scheme according to an example embodiment. In detail, FIG. 3A is a waveform diagram of a PPOOM signal in a frequency shift keying (FSK) system, for example, a SUN, and FIG. 3B is a waveform diagram of a PPOOM signal in an orthogonal frequency division multiplexing (OFDM) system, for example, a Wi-Fi and a SUN.

Referring to FIGS. 3A and 3B, direct communication between heterogeneous network apparatuses may be performed by patterning information transmission and reception packets. Here, low rate data based direct communication is enabled by applying a two-way communication scheme, instead of applying a one-way communication scheme. For example, in addition to one-way communication from a Wi-Fi device to an IEEE 802.15.4 device, inverse communication from the IEEE 802.15.4 device to the Wi-Fi device may be performed. Since the PPOOM scheme detects data based on a received signal strength, PPOOM-based communication from the IEEE 802.15.4 device to the Wi-Fi device may be sufficiently performed. It may indicate that two-way communication may be performed using a packet pattern communication scheme. Since the PPOOM-based communication from the IEEE 802.15.4 device to the Wi-Fi device is enabled, the Wi-Fi device may monitor simple control information and a sensor value of the IEEE 802.15.4 device through direct communication with the IEEE 802.15.4 device.

Information may be carried in a signal pattern of a packet and thereby transmitted to achieve direct communication between heterogeneous network apparatuses. That is, whether to transmit a transmission packet may be determined based on transmission data. The transmission data may be carried in an ON/OFF pattern of a transmission packet and thereby transmitted. In this aspect, such transmission scheme is referred to as a PPOOM scheme.

The PPOOM scheme may carry a digital signal in information regarding whether to transmit a packet or frame signal and thereby transmit the digital signal. For example, referring to FIGS. 3A and 3B, a digital signal '1' may be carried and thereby transmitted in a packet transmission section and a digital signal '0' may be carried and thereby transmitted in a packet non-transmission section. An inverse relationship may be applied. For example, a digital signal '0' may be mapped in a packet transmission section and a digital signal '1' may be mapped in a packet non-transmission section. In this aspect, the PPOOM scheme is significantly similar to an ON/OFF keying (OOK) modulation scheme. The PPOOM scheme differs from the OOK modulation scheme in that the OOK modulation scheme carries and thereby transmits information in a carrier having no information and the PPOOM scheme transmits an original modulation signal, for example, a Wi-Fi signal or an IEEE 802.15.4 signal to a source from which a signal is transmitted. That is, the PPOOM scheme may carry and thereby transmit middle/high rate data using the Wi-Fi or IEEE 802.15.4 signal and may also map, carry and thereby transmit low rate data using a pattern. The PPOOM scheme may perform gateway-based middle/high rate communication in an application, such as an initial setting, a thorough testing, a failure diagnosis, etc., and may also perform gateway-free low rate communication in an application, such as a simple control, monitoring, etc., with respect to a transmission signal. Accordingly, the gateway-based middle/high rate communication and the gateway-free low rate communication may be simultaneously performed.

Figure 4:
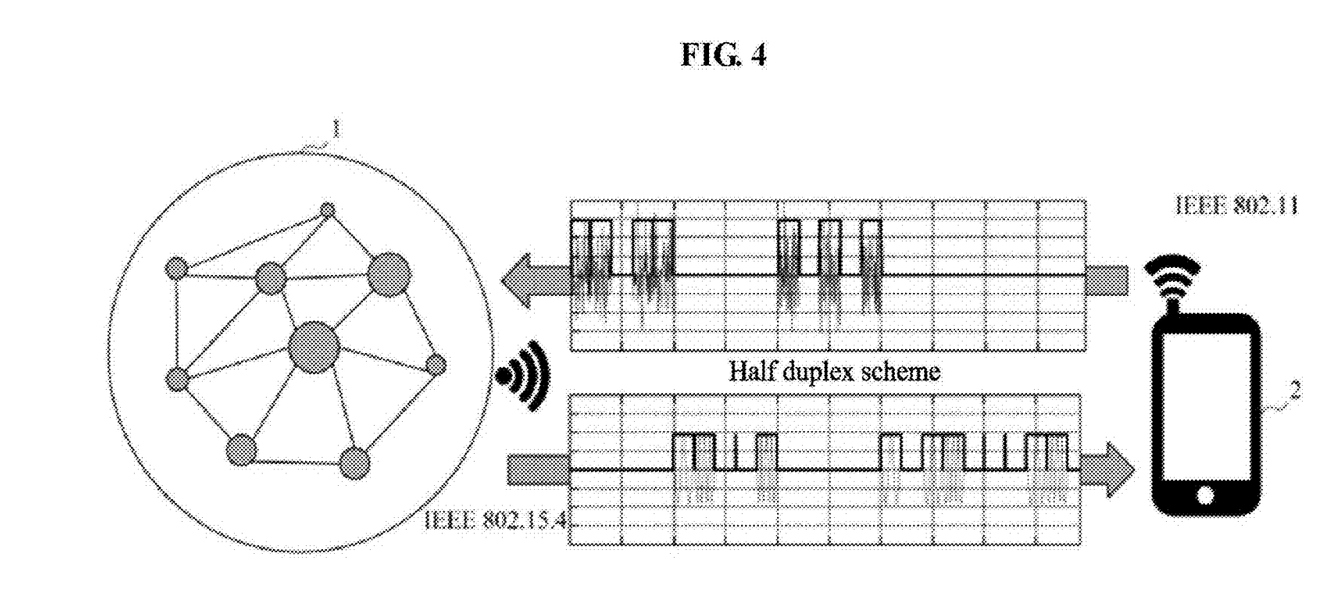
FIG. 4 illustrates an example of PPOOM two-way communication based on a half duplex scheme according to an example embodiment.

FIG. 4 illustrates an example of PPOOM two-way communication based on a half duplex scheme according to an example embodiment.

According to an example embodiment, when performing two-way communication between a Wi-Fi device and an IEEE 802.15.4 device, interference may occur between a Wi-Fi signal and an IEEE 802.15.4 signal. Heterogeneous networks need to use the same frequency band in order to use a packet pattern communication scheme of detecting data from received signal strength at a reception end. A SUN may support a frequency band less than 1 GHz. An IEEE 802.11 network associated with Wi-Fi and an IEEE 820.15.4 network associated with ZigBee and a SUN generally use a 2.4 GHz ISM unlicensed band. In the case of a general wireless communication, different communication signals of the same frequency band transmitted from different systems may act as interference sources against each other. In particular, in the case of schemes using signal strength, such as a packet pattern communication scheme, an interference level may be further degraded.

According to example embodiments, a half duplex scheme is used to achieve two-way communication through a PPOOM scheme. The half duplex scheme is a communication scheme in which one end performs transmission and the other end performs reception. That is, although two-way communication is allowed, both ends may not simultaneously transmit a communication signal. For example, referring to FIG. 4, if an IEEE 802.15.4 device and a Wi-Fi device perform direct communication, a Wi-Fi signal transmitted from the Wi-Fi device to the IEEE 802.15.4 device and an IEEE 802.15.4 signal transmitted from the IEEE 802.15.4 to the Wi-Fi device may not temporally overlap. Accordingly, two-way communication is possible without causing interference.

Figure 5A:
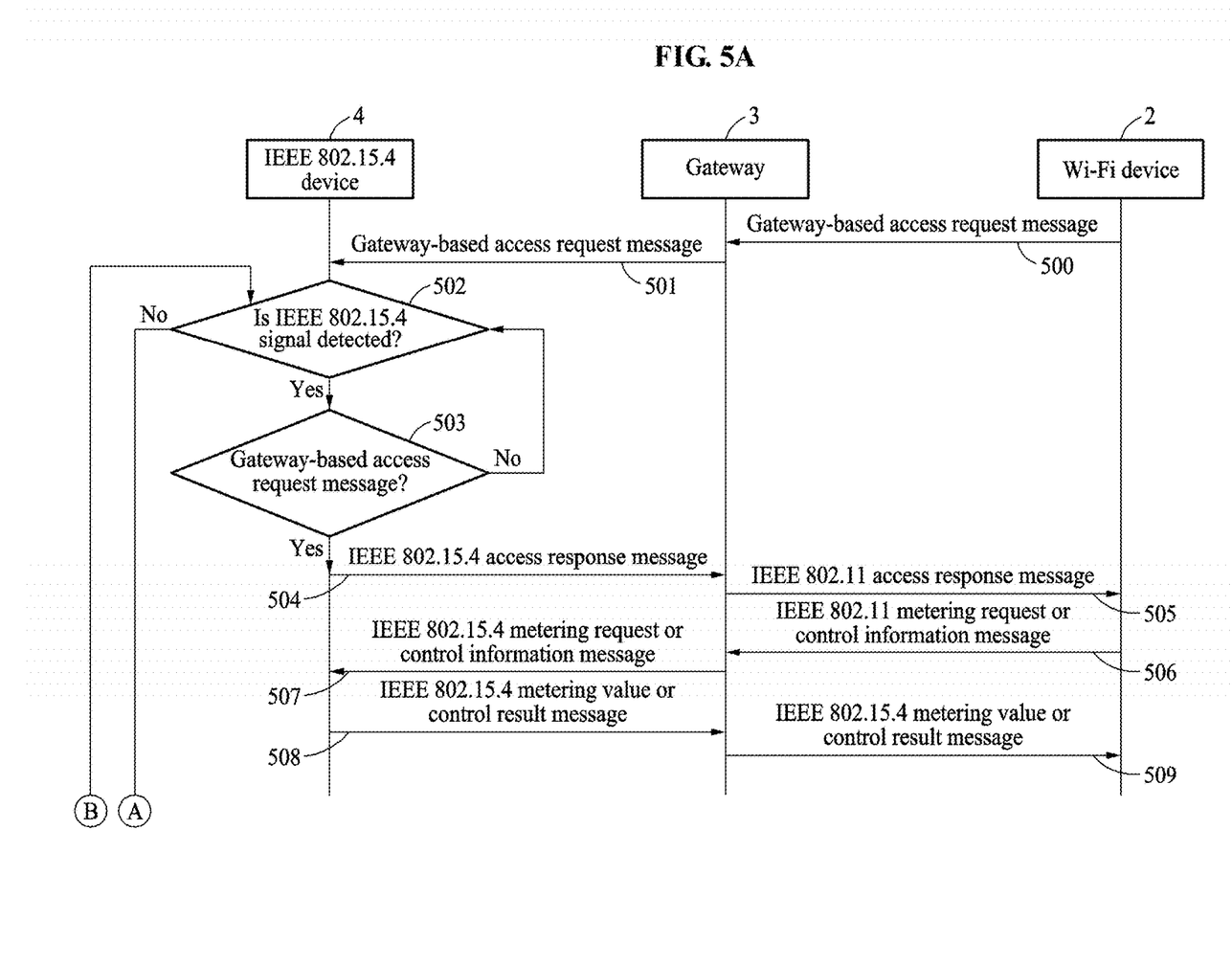
FIGS. 5A and 5B illustrate examples of a method of interconnecting heterogeneous networks based on a dual mode according to an example embodiment.
Figure 5B:
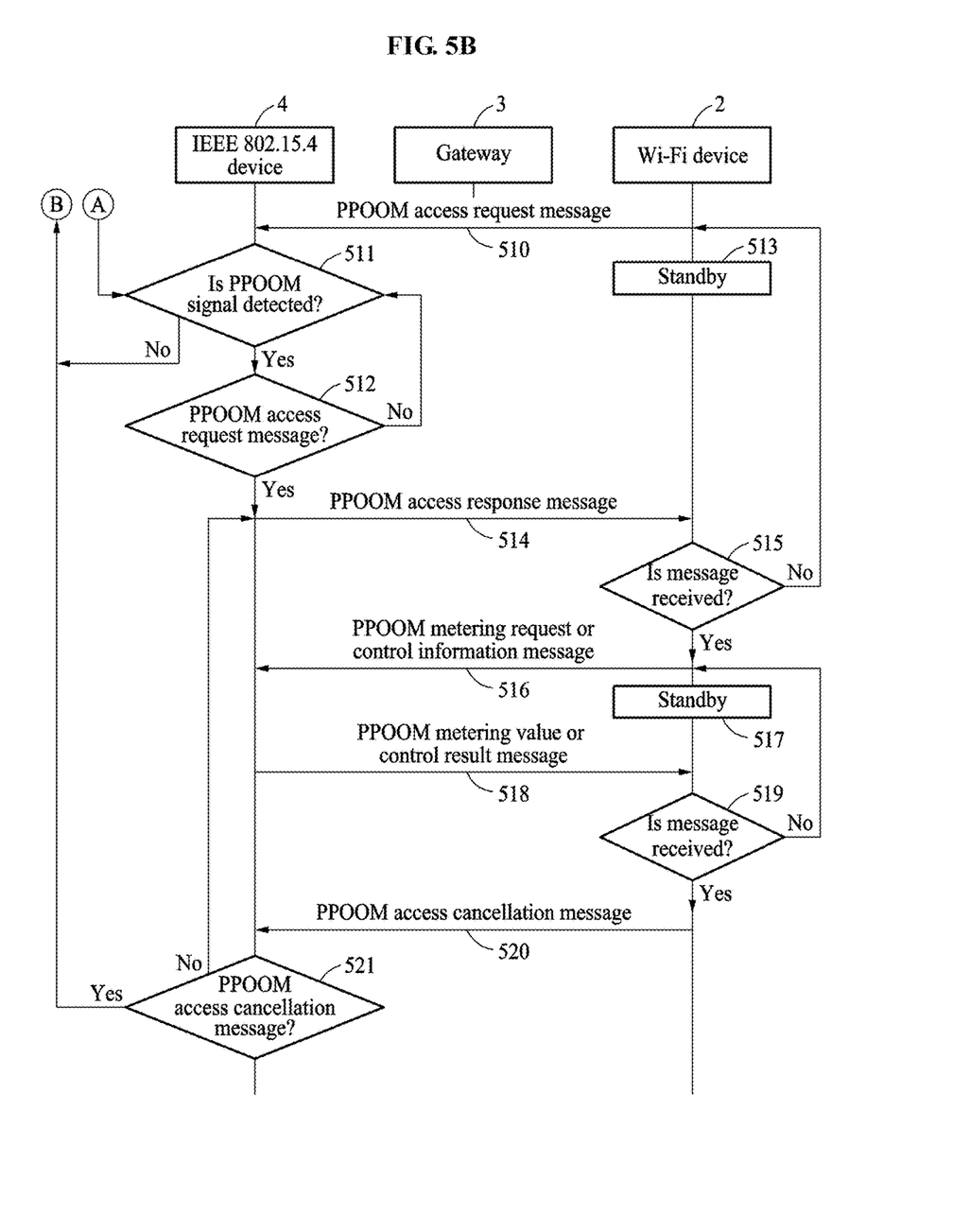

FIGS. 5A and 5B illustrate examples of a method of interconnecting heterogeneous networks based on a dual mode according to an example embodiment. In detail, FIG. 5A illustrates an example of a communication method in a gateway-based high rate communication mode and FIG. 5B illustrates an example of a direct communication method in a gateway-free low rate communication mode.

Since a PPOOM scheme carries and thereby transmits data using a packet pattern, a communication rate may be limited. Also, since the PPOOM scheme detects data from a received signal strength, communication performance may be limited. Accordingly, the PPOOM scheme may not be readily employed for an initial setting, a thorough testing, a failure diagnosis, etc., which requires high quality and middle/high rate communication. The PPOOM scheme may be appropriate for monitoring of a sensor value or simple control, which is generally performed in a convenient way. Accordingly, a general gateway-based interconnection and a PPOOM-based gateway-free direct interconnection may be distinguished from each other based on an application scheme and thereby be supported as a dual mode. Thus, a protocol for a dual mode interconnection scheme is required.

Referring to FIGS. 5A and 5B, in the case of an application such as a thorough testing, a failure diagnosis, etc., a Wi-Fi device 2 may monitor metering values or perform sensor control through a gateway 3. In detail, in operation 500, the Wi-Fi device 2 transmits a gateway-based access request message to the gateway 3 as an IEEE 802.11 signal. In operation 501, the gateway 3 converts the received IEEE 802.11 access request message to a gateway-based access request in a form of an IEEE 802.15.4 signal to be suitable for an IEEE 802.15.4 network, and transmits the converted gateway-based access request message to an IEEE 802.15.4 device 4.

In operation 502, the IEEE 802.15.4 device 4 may perform IEEE 802.15.4 demodulation on the received signal and may determine whether the received signal is an IEEE 802.15.4 signal. If the received signal is determined to be the IEEE 802.15.4 signal, the IEEE 802.15.4 device 4 may maintain a gateway-based IEEE 802.15.4 communication mode. Otherwise, the IEEE 802.15.4 device 4 may move to operation 511 of detecting a PPOOM signal for a PPOOM-based direction communication mode. In operation 503, the IEEE 802.15.4 device 4 may verify the gateway-based access request message from the received IEEE 802.15.4 signal in operation 503, and may transmit an IEEE 802.15.4 access response message to the gateway 3 if the gateway-based access request message is verified in operation 504, and may return to operation 502 for an IEEE 802.15.4 signal detection state if the gateway-based access request message is not verified.

In operation 505, the gateway 3 may convert the received IEEE 802.15.4 access response message to an IEEE 802.11 access response message suitable for the Wi-Fi device and may transmit the converted message to the Wi-Fi device 2. In operation 506, the Wi-Fi device 2 may transmit an IEEE 802.11 metering request or control information message to the gateway 3. In operation 507, the gateway 3 may convert the received IEEE 802.11 metering request or control information message to an IEEE 802.15.4 metering request or control information message and transmit the converted message to the IEEE 802.15.4 device 4. In operation 508, the IEEE 802.15.4 device 4 may transmit an IEEE 802.15.4 metering result or control result message to the gateway 3 in response to the request from the Wi-Fi device 2. In operation 509, the gateway 3 may convert the IEEE 802.15.4 metering value or control result message to an IEEE 802.11 metering value or control result message and may transmit the converted message to the Wi-Fi device 2.

Meanwhile, a PPOOM-based communication may be used to conveniently monitor a metering value or perform simple control of the IEEE 802.15.4 network. In operation 511, if the signal detected through the IEEE 802.15.4 demodulation is determined to not be the IEEE 802.15.4 signal, the IEEE 802.15.4 device 4 may be on standby to detect a PPOOM signal in order to enter into a PPOOM-based direct communication mode. If the PPOOM signal is not detected within a preset period of time, the IEEE 802.15.4 device 4 may return to operation 502 that is an IEEE 802.15.4 signal detection operation. In this manner, it is possible to prevent missing of a gateway-based network communication signal due to being in a PPOOM communication mode.

In operation 512, the IEEE 802.15.4 device 4 may verify whether data detected through PPOOM demodulation from a signal that is received from the Wi-Fi device 2 without using the gateway 3 in operation 511 that is the PPOOM signal detection operation corresponds to a PPOOM access request message transmitted from the Wi-Fi device 2 in operation 510. Here, after transmitting the PPOOM access request message for two-way communication based on a half duplex scheme, the Wi-Fi device 2 may be on standby to receive a PPOOM signal from the IEEE 802.15.4 device 4 without generating a signal within a preset period of time in operation 513.

If the received data is verified as the PPOOM access request message in operation 512, the IEEE 802.15.4 device 4 may modulate an access response message to a PPOOM signal and may transmit a PPOOM access response message to the Wi-Fi device 2 in operation 514. The Wi-Fi device 2 may determine whether the PPOOM access response message is received in operation 515, and if the PPOOM access response message is determined to be received, may transmit a PPOOM metering request or control information message to the IEEE 802.15.4 device 4 in operation 516. On the contrary, if the PPOOM access response message is determined to not be received, the Wi-Fi device 2 may retransmit the PPOOM access request message to the IEEE 802.15.4 device 4 in operation 510.

Even after transmitting the PPOOM metering request or control information message in operation 515, the Wi-Fi device 2 may be on standby to receive a PPOOM signal from the IEEE 802.15.4 device 4 without generating a signal within a preset period of time for two-way communication based on the half duplex scheme in operation 517. In operation 519, the Wi-Fi device may determine whether a PPOOM metering value or control result message transmitted from the IEEE 802.15.4 device 4 in operation 518 is received, and may determine whether to retransmit the PPOOM metering request or control information message.

If the PPOOM metering value or control result message is determined to be received, the Wi-Fi device 2 may transmit a PPOOM access cancellation message to the IEEE 802.15.4 device 4 in operation 520. The IEEE 802.15.4 device 4 may verify whether the PPOOM access cancellation message is received in operation 521. If the PPOOM access cancellation message is not received, the IEEE 802.15.4 device 4 may transmit the PPOOM access response message to the Wi-Fi device in operation 514 and may wait for a PPOOM signal from the Wi-Fi device 2. If the PPOOM access cancellation message 520 is received from the Wi-Fi device 2, the IEEE 802.15.4 device 4 may return to operation 502 that is the IEEE 802.15.4 signal detection operation.

Figure 6:
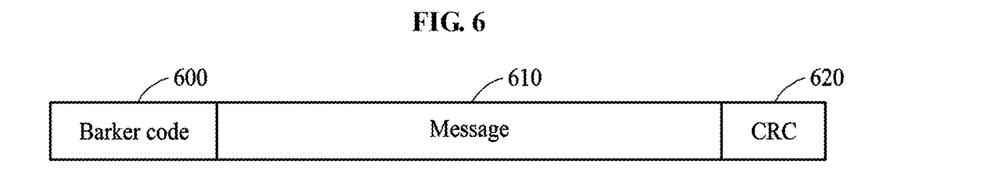
FIG. 6 illustrates a format of a PPOOM-based heterogeneous network communication message according to an example embodiment.

FIG. 6 illustrates a format of a PPOOM-based heterogeneous network communication message according to an example embodiment.

A specific signal pattern may be used to perform operation 511 of detecting a PPOOM signal and operations 515, 519, and 521 of verifying whether a message is received shown in FIG. 5B. Herein, a specific signal pattern suitable for a PPOOM scheme based on detection of received signal strength is proposed as an example.

Referring to FIGS. 5A and 5B, and FIG. 6, a barker code 600 having an excellent autocorrelation characteristic may be disposed at front of a message 610 to be transmitted. The barker code 600 is used to detect the PPOOM signal in operation 511 and thus, needs to have an excellent autocorrelation characteristic. The barker code 600 is to have a possibly short code length in order to reduce an error by a timing offset in a low rate PPOOM scheme. Based on such relationship, 7 bits or 11 bits may be suitable for the code length of the barker code 600.

To determine whether the message 610 is received in operation 515, 519, 521, a cyclic redundancy check 620

(CRC) may be added at back of the message 610. Whether an error is present in a received message may be determined based on the CRC 620. To reduce an error by a timing offset in a low rate PPOOM scheme, the CRC 620 may be a short length of CRD-5.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network apparatus comprising:
    a communicator configured to communicate with a heterogeneous network apparatus using a same frequency band, to communicate with the heterogeneous network apparatus through a gateway in a first communication mode, and to perform direct two-way communication with the heterogeneous network apparatus in a second communication mode; and
    a processor configured to determine a signal received through the communicator, and, in response thereto, control a communication mode of the communicator with the heterogeneous communication network to operate in the first communication mode or the second communication mode,
    wherein the processor is further configured to control the communication mode with the heterogeneous network apparatus as the second communication mode in response to the signal received through the communicator being determined to be a packet pattern ON/OFF modulation signal.

2. The network apparatus of claim 1, wherein the communicator is further configured to perform high rate communication in the first communication mode and to perform low rate communication in the second communication mode.

3. The network apparatus of claim 1, wherein the communicator is further configured to perform two-way communication with the heterogeneous network apparatus using a half duplex scheme in the second communication mode.

4. The network apparatus of claim 1, wherein the communicator is further configured to perform two-way communication with the heterogeneous network apparatus using a packet pattern scheme that carries data in a packet pattern and thereby transmits the packet pattern in the second communication mode.

5. The network apparatus of claim 4, wherein the communicator is further configured to map and carry low rate data to the packet pattern and thereby transmit the packet pattern while transmitting middle and high rate data using an original signal.

6. The network apparatus of claim 1, wherein the packet pattern ON/OFF modulation signal includes a barker code for detecting the packet pattern ON/OFF modulation signal and an error detection code for determining an error.

7. The network apparatus of claim 1, wherein the network apparatus is an Institute of Electrical and Electronics Engineers (IEEE) 802.15.4 device and the heterogeneous network apparatus is a wireless fidelity (Wi-Fi) device.

8. A heterogeneous network interconnecting method between an Institute of Electrical and Electronics Engineers (IEEE) 802.15.4 device and a wireless fidelity (Wi-Fi) device, the method comprising:
   determining, at the IEEE 802.15.4 device, whether a received signal is an IEEE 802.15.4 signal, and communicating with the Wi-Fi device through a gateway in response to the received signal being determined to be the IEEE 802.15.4 signal; and
   determining, at the IEEE 802.15.4 device, whether the received signal is a packet pattern ON/OFF modulation signal, and performing direct two-way communication with the Wi-Fi device without using the gateway in response to the received signal being determined to be the packet pattern ON/OFF modulation signal.

9. The method of claim 8, further comprising:
   determining whether the received signal is the IEEE 802.15.4 signal in response to failing in detecting the packet pattern ON/OFF modulation signal within a preset time.

10. The method of claim 8, wherein the performing of the direct two-way communication comprises:
    detecting data through demodulation in response to the received signal being determined to be the packet pattern ON/OFF modulation signal, and verifying whether the detected data is an access request message;
    modulating an access response message to the packet pattern ON/OFF modulation signal in response to the detected data being verified to the access request message, and transmitting the modulated access response message to the Wi-Fi device;
    receiving a metering request or a control information message from the Wi-Fi device that receives the access response message, and transmitting a metering value or a control result message to the Wi-Fi device; and
    receiving an access cancellation message from the Wi-Fi device that receives the metering value or control result message, and cancelling the access.

11. The method of claim 10, wherein the transmitting of the access response message comprises transmitting the access response message to the Wi-Fi device while the Wi-Fi device is on standby during a preset period of time after transmitting the access request message.

12. The method of claim 10, wherein the transmitting of the metering value or control result message comprises transmitting the access value or control result message to the Wi-Fi device while the Wi-Fi device is on standby during a preset period of time after transmitting the metering request or control information message.

13. The method of claim 8, wherein the packet pattern ON/OFF modulation signal includes a barker code for detecting the packet pattern ON/OFF modulation signal and an error detection code for determining an error.

* * * * *